(12) United States Patent
Tangermann et al.

(10) Patent No.: US 11,506,107 B2
(45) Date of Patent: Nov. 22, 2022

(54) ARRANGEMENT AND METHOD FOR CONNECTING FLUID-CONDUCTING COMPONENTS, MORE PARTICULARLY IN THE EXHAUST GAS LINE OF A MOTOR VEHICLE

(71) Applicants: Audi AG, Ingolstadt (DE); Volkswagen AG, Wolfsburg (DE)

(72) Inventors: Sönke Andreas Tangermann, Neckarsulm (DE); Holger Morsch, Neudenau (DE); Bertram Seidl, Oberhausen an der Donau (DE); Onur Ulas Car, Berlin (DE); Janet Schlothauer, Klötze (DE)

(73) Assignees: AUDI AG, Ingolstadt (DE); VOLKSWAGEN AG, Wolfsburg (DE)

( * ) Notice: Subject to any disclaimer, the term of this patent is extended or adjusted under 35 U.S.C. 154(b) by 225 days.

(21) Appl. No.: 16/771,557

(22) PCT Filed: Dec. 7, 2018

(86) PCT No.: PCT/EP2018/083993
§ 371 (c)(1),
(2) Date: Jun. 10, 2020

(87) PCT Pub. No.: WO2019/115390
PCT Pub. Date: Jun. 20, 2019

(65) Prior Publication Data
US 2021/0071563 A1    Mar. 11, 2021

(30) Foreign Application Priority Data

Dec. 11, 2017    (DE) .................... 10 2017 222 383.9

(51) Int. Cl.
F16L 23/08    (2006.01)
F01N 13/18    (2010.01)
F16L 23/18    (2006.01)

(52) U.S. Cl.
CPC .......... F01N 13/1844 (2013.01); F16L 23/08 (2013.01); F16L 23/18 (2013.01)

(58) Field of Classification Search
CPC . F16L 23/04; F16L 23/08; F16L 23/16; F16L 23/18; F16L 23/20; F16L 23/23; F16L 2201/10
(Continued)

(56) References Cited

U.S. PATENT DOCUMENTS 3,937,501 A * 2/1976 Weinhold ................ F16L 33/12
285/365
2006/0202480 A1    9/2006 Cassel et al.
2011/0277466 A1    11/2011 Danielewicz et al.

FOREIGN PATENT DOCUMENTS

DE    102011108441    1/2013
DE    102015215975    2/2017
(Continued)

OTHER PUBLICATIONS

International Search Report issued by the European Patent Office in International Application PCT/EP2018/083993 dated Jan. 28, 2019.

*Primary Examiner* — Aaron M Dunwoody
(74) *Attorney, Agent, or Firm* — Henry M. Feiereisen LLC

(57) ABSTRACT

The invention relates to an arrangement (100) for connecting a first fluid-conducting component (110) to a second fluid-conducting component (120), more particularly in the exhaust gas line of a motor vehicle, having a seal (130), which seals the components (110, 120) at the connecting point, and having a band clamp (140), which encloses the components (110, 120) at the connecting point and attaches
(Continued)

the components (110, 120) to each other. According to the invention, the seal (130) is formed with a tab (131), which protrudes at the connecting point after the components (110, 120) have been connected and is visible through a separation joint (141) of the band clamp (140). The invention further relates to a corresponding method for connecting a first fluid-conducting component (110) to a second fluid-conducting component (120).

24 Claims, 1 Drawing Sheet

(58) Field of Classification Search
USPC ........ 285/337, 367, 366, 365, 407, 408, 410
See application file for complete search history.

(56) References Cited

FOREIGN PATENT DOCUMENTS

| | | |
|---|---|---|
| DE | 102016103687 | 9/2017 |
| FR | 2 906 864 | 4/2008 |
| FR | 2 925 648 | 6/2009 |

\* cited by examiner

ARRANGEMENT AND METHOD FOR CONNECTING FLUID-CONDUCTING COMPONENTS, MORE PARTICULARLY IN THE EXHAUST GAS LINE OF A MOTOR VEHICLE

CROSS-REFERENCES TO RELATED APPLICATIONS

This application is the U.S. National Stage of International Application No. PCT/EP2018/083992, filed Dec. 7, 2018, which designated the United States and has been published as International Publication No. WO 2019/115390 and which claims the priority of German Patent Application, Serial No. 10 2017 222 383.9, filed Dec. 11, 2017, pursuant to 35 U.S.C. 119(a)-(d).

BACKGROUND OF THE INVENTION

The invention relates to an arrangement for connecting a first fluid-conducting component to a second fluid-conducting component, more particularly in the exhaust gas line of a motor vehicle, having a seal, which seals the components at the connecting point, and having a band clamp, which encloses the components at the connecting point and attaches the components to each other.

The invention relates further to a method for connecting a first fluid-conducting component to a second fluid-conducting component, more particularly in the exhaust gas line of a motor vehicle.

A fluid-conducting component according to the invention is e.g. a pipeline (also a flexible pipe), a hose line, a housing (e.g. a turbocharger housing or a muffler), a fitting (e.g. a valve), an adapter and the like, through which a fluid, in particular an exhaust gas of an internal combustion engine, is conducted. In particular, these are exhaust gas conducting components of an exhaust system or exhaust gas conducting device on a motor vehicle.

DE 10 2015 215 975 A1 describes an exhaust gas line of a vehicle, comprising a first exhaust gas conducting section, a second exhaust gas conducting section, and a band damp connecting the two sections.

Once the damp or band clamp has been mounted, it is no longer possible to check whether a seal has been fitted. If in doubt, the connection must be disassembled again. The problem underlying the invention is to provide a remedy for this.

SUMMARY OF THE INVENTION

The problem is solved by the subject-matter of the independent claims. Expanded versions and embodiments of the invention result analogously for all subject-matter of the invention from the dependent claims, the following description and the drawing.

The arrangement in according with the invention is characterized in that the seal is formed with (at least) one tab which, when the components are connected or after the components have been connected, Le, in the assembled state, projects (outwards) at the connecting point or protrudes from the connecting point between the connected components, and is visible through a separation joint of the band clamp.

The visible tab always allows to verify whether the seal has been fitted. A tab is in particular a small-surface (e.g. <1 cm²), leaf-like element that protrudes radially and/or axially from the seal body, in particular a sealing ring. The tab has no influence on the sealing between the components and in particular only serves to fulfill a visual or recognition function. The tab can be marked in color and, for example, be provided with a common signal color so that it can also be recognized in poor lighting conditions.

The separation joint is the gap or opening between the two ends or ring ends of the band clamp. Preferably, the band clamp has a single tensioning screw at the separation joint, which connects the two ends of the clamp band, which is usually of annular design, such that the circumference or diameter of the band clamp can be changed by turning the tensioning screw. It is preferable that this tensioning screw is arranged in such a way that the separation joint is open for inspection.

The two components are preferably formed with T-flanges or ring flanges at their ends or connecting sections to be connected and the band clamp is preferably formed as a hollow band clamp and especially as a V-band clamp which overlaps the T-flanges.

It is preferably provided that one of the components, in particular the first component, is formed with a groove or the like at its end to be connected or at its connecting section, and that the seal is formed with a lug or the like, wherein the lug on the seal fits exactly into the groove on the component and the seal thereby can be positioned exactly or is exactly positionable in the circumferential direction. Furthermore, it is preferably provided that one of the components, in particular the second component, is formed with a mandrel or the like at its end to be connected or at its connecting section, and that the band clamp is formed with a lug or the like, wherein the mandrel on the component and the lug on the band clamp form a rotation stop or twist stop for the band clamp and thereby the band clamp can be positioned exactly or is exactly positionable in the circumferential direction.

The two measures described above allow the seal and the band clamp to be positioned or aligned in the circumferential direction during assembly, i.e. the groove, the mandrel and the lugs are positioning means or positioning aids. This also positions or aligns the seal and the band clamp relative to each other in the circumferential direction, ensuring that the tab is visible through the separation joint of the band clamp.

Preferably, the seal, including the tab and, where applicable, the lug, is formed as a single piece. The seal can be a single-piece stamped and formed part made of sheet metal. The seal can also be made as a single piece from plastic or composite material.

The method in accordance with the invention for connecting a first fluid-conducting component to a second fluid-conducting component, in particular in the exhaust gas line of a motor vehicle, comprises the following steps:

providing the first fluid-conducting component and the second fluid-conducting component, which, where appropriate, have already been installed or pre-assembled in the motor vehicle;

manufacturing an arrangement in accordance with the invention for the fluid-conducting connection of these two components, wherein in particular the seal and the band damp are aligned relative to each other, as explained above;

visual inspection or visual check whether the tab of the seal is visible through the separation joint of the band clamp, wherein this inspection can be carried out manually or automatically at any time (e.g. also in a workshop).

The invention is preferably used for the exhaust gas line or exhaust system of a motor vehicle, in particular for connecting or for the connection of the catalytic converter and the particulate filter or the particulate filter and the EGR cooler or for connecting the turbocharger.

BRIEF DESCRIPTION OF THE DRAWING

The invention is explained in more detail below with use of the drawing. The features shown in the figures of the drawing and/or explained below may, even independently of certain combinations of features, be general features of the invention and further develop the invention accordingly.

DETAILED DESCRIPTION OF PREFERRED EMBODIMENTS

Figure 1:
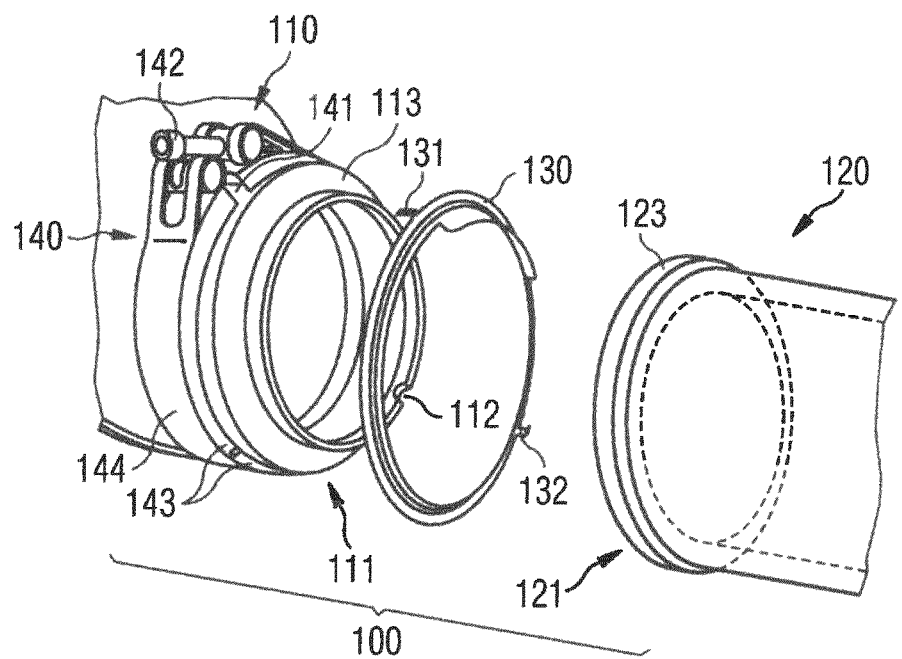
FIG. 1 shows a perspective view of an arrangement in accordance with the invention before connecting.

FIG. 1 shows an arrangement 100 in accordance with the invention for the fluid-conducting connection of a first fluid-conducting component 110 to a second fluid-conducting component 120, in particular components in the exhaust gas line of a motor vehicle. In addition to the two components 110 and 120, arrangement 100 also includes a seal 130 designed as a ring seal and a band clamp 140. The band clamp 140 has a separation joint 141, on which a tensioning screw 142 is arranged radially offset in outward direction. The band clamp 140 is designed as a V-band clamp and has several profile segments 143 with a V-shaped cross-section, which are welded (on the inside) to an outer band 144 which can be tensioned with the tensioning screw 142.

The single-piece seal 130 is formed with a tab 131 which, after the components 110, 120 have been connected, i.e. in the assembled state of the arrangement 100, projects at the connecting point, i.e. protrudes from the connected components 110, 120, and is visible through the separation joint 141 of the band clamp 140. The tab 131 is therefore still visible after assembly. Thereby a simple visual inspection can show whether a seal 130 was installed when the two components 110, 120 were connected. The tensioning screw 142 radially offset in outward direction provides a good view of the separation joint 141 lying thereunder.

The seal 130 is further formed with a flap-like lug 132 (first lug) and the first component 110 is formed with a corresponding groove or recess 112 at its end to be connected or at its connecting section 111. The lug 132 fits exactly into the groove 112, such that the seal 130 can be positioned exactly in the circumferential direction when it is placed on the connecting section 111. The tab 131 thus occupies a defined position in the circumferential direction.

Figure 2:
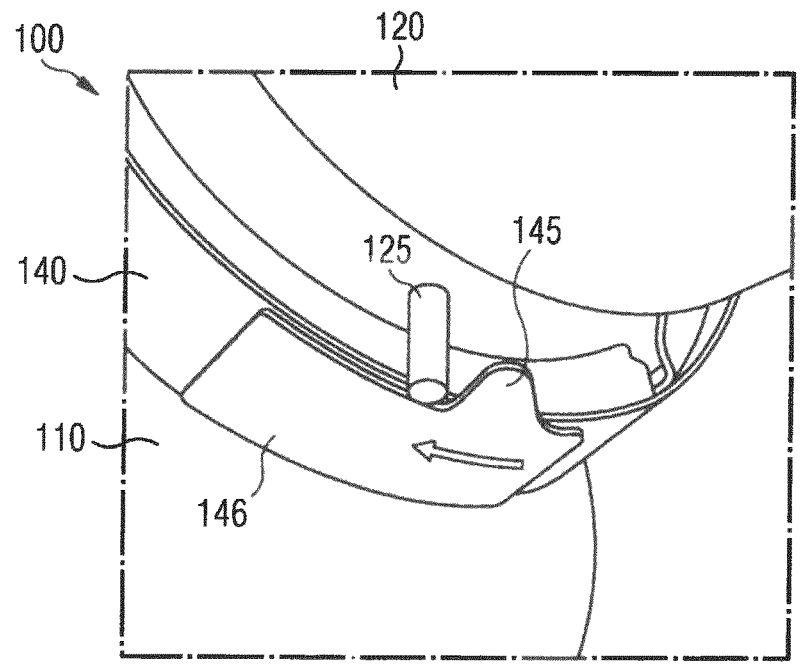
FIG. 2 shows another perspective view of the arrangement in accordance with the invention during connecting.

As can be seen from FIG. 2, the second component 120 is formed with a radially projecting mandrel or dome 125 at its end to be connected or at its connecting section 121 and the band clamp 140 is formed with a flap-like lug 145 (second lug). The lug 145 is part of an attachment 146 welded (on the outside) to the outer band 144. The mandrel 125 and the lug 145 form a rotation stop for the band clamp 140. When tensioning the band clamp 140, after it has been pushed over both T-flanges 113, 123, a circumferential force is applied to the band clamp 140 with the screwing tool attached to the tensioning screw 142, causing the band clamp 140 to be rotated in the circumferential direction, as illustrated by the arrow, until the lug 145 touches the mandrel 125. Thereby the band clamp 140 is also exactly positioned in the circumferential direction and the separation joint 141 has a defined position in the circumferential direction.

As it were, the seal 130 is aligned on the first component 110 and the band clamp 140 on the second component 120, with the aim of ensuring that the separation joint 141 and the tab 131 overlap each other in the circumferential direction. The seal 130 and the band clamp 140 can also be aligned in a similar way only on the first component 110 or only on the second component 120.

What is claimed is:

1. An arrangement for connecting a first fluid-conducting component to a second fluid-conducting component, said arrangement comprising:
   a seal sealing the first and second fluid-conducting components at a connecting point; and
   a band clamp configured to enclose the first and second fluid-conducting components at the connecting point and to attach the first and second fluid-conducting components to each other,
   said seal formed with a tab configured to protrude at the connecting point after the first and second fluid-conducting components have been connected, said tab being visible through a separation joint of the band clamp,
   wherein the band clamp includes a single tensioning screw arranged at the separation joint such as to enable inspection of the separation joint.

2. The arrangement of claim 1, wherein the first and second fluid-conducting components are components in an exhaust gas line of a motor vehicle.

3. The arrangement of claim 1, wherein the tab is marked in color.

4. The arrangement of claim 1, wherein the first fluid-conducting component has a connecting-point-facing end formed with a groove, said seal formed with a lug contoured to complement a contour of the groove, thereby allowing an exact positioning of the seal in a circumferential direction.

5. The arrangement of claim 1, wherein the first and second fluid-conducting components are each formed with a T-flange, said band clamp embodied as a V-band clamp.

6. The arrangement of claim 1, wherein the seal is formed as a single piece.

7. An arrangement for connecting a first fluid-conducting component to a second fluid-conducting component, said arrangement comprising:
   a seal sealing the first and second fluid-conducting components at a connecting point; and
   a band clamp configured to enclose the first and second fluid-conducting components at the connecting point and to attach the first and second fluid-conducting components to each other,
   said seal formed with a tab configured to protrude at the connecting point after the first and second fluid-conducting components have been connected, said tab being visible through a separation joint of the band clamp,
   wherein the second fluid-conducting component has a connecting-point-facing end formed with a mandrel, said band clamp formed with a lug, with the mandrel and the lug forming a rotation stop, thereby enabling an exact positioning of the band clamp in a circumferential direction.

8. The arrangement of claim 7, wherein the first and second fluid-conducting components are components in an exhaust gas line of a motor vehicle.

9. The arrangement of claim 7, wherein the tab is marked in color.

10. The arrangement of claim 7, wherein the first fluid-conducting component has a connecting-point-facing end formed with a groove, said seal formed with a lug contoured to complement a contour of the groove, thereby allowing an exact positioning of the seal in a circumferential direction.

11. The arrangement of claim 7, wherein the first and second fluid-conducting components are each formed with a T-flange, said band clamp embodied as a V-band clamp.

12. The arrangement of claim 7, wherein the seal is formed as a single piece.

13. A method for connecting a first fluid-conducting component to a second fluid-conducting component, said method comprising:
    forming a seal with a tab;
    enclosing the first and second fluid-conducting components at a connecting point by a band clamp to attach the first and second fluid-conducting components to each other;
    sealing the first and second fluid-conducting components at the connecting point by the seal such that the tab protrudes at the connecting point after the first and second fluid-conducting components have been connected;
    visually checking whether the tab of the seal is visible through a separation joint of the band clamp; and
    arranging a single tensioning screw of the band clamp at the separation joint such as to enable inspection of the separation joint.

14. The method of claim 13, further comprising connecting the first fluid-conducting component to the second fluid-conducting component in an exhaust gas line of a motor vehicle.

15. The method of claim 13, further comprising marking the tab in color.

16. The method of claim 13, further comprising:
    forming a connecting-point-facing end of the first fluid-conducting component with a groove; and
    forming the seal with a lug contoured to complement a contour of the groove, thereby allowing an exact positioning of the seal in a circumferential direction.

17. The method of claim 13, wherein the first and second fluid-conducting components are each formed with a T-flange, said band clamp configured as a V-band clamp.

18. The method of claim 13, wherein the seal is formed as a single piece.

19. A method for connecting a first fluid-conducting component to a second fluid-conducting component, said method comprising:
    forming a seal with a tab;
    enclosing the first and second fluid-conducting components at a connecting point by a band clamp to attach the first and second fluid-conducting components to each other;
    sealing the first and second fluid-conducting components at the connecting point by the seal such that the tab protrudes at the connecting point after the first and second fluid-conducting components have been connected;
    visually checking whether the tab of the seal is visible through a separation joint of the band clamp; and
    forming a connecting-point-facing end of the second fluid-conducting component with a mandrel; and
    forming the band clamp with a lug; and
    applying a circumferential force to the band clamp to cause a rotation of the band clamp until the lug of the band clamp touches the mandrel, thereby enabling an exact positioning of the band clamp in a circumferential direction.

20. The method of claim 19, further comprising connecting the first fluid-conducting component to the second fluid-conducting component in an exhaust gas line of a motor vehicle.

21. The method of claim 19, further comprising marking the tab in color.

22. The method of claim 19, further comprising:
    forming a connecting-point-facing end of the first fluid-conducting component with a groove; and
    forming the seal with a lug contoured to complement a contour of the groove, thereby allowing an exact positioning of the seal in a circumferential direction.

23. The method of claim 19, wherein the first and second fluid-conducting components are each formed with a T-flange, said band clamp configured as a V-band clamp.

24. The method of claim 19, wherein the seal is formed as a single piece.

* * * * *